United States Patent [19]

Fowler et al.

[11] 4,166,760
[45] Sep. 4, 1979

[54] PLASMA CONFINEMENT APPARATUS USING SOLENOIDAL AND MIRROR COILS

[75] Inventors: T. Kenneth Fowler, Walnut Creek; William C. Condit, Livermore, both of Calif.

[73] Assignee: The United States of America as represented by the United States Department of Energy, Washington, D.C.

[21] Appl. No.: 839,226

[22] Filed: Oct. 4, 1977

[51] Int. Cl.² .............................................. G21B 1/00
[52] U.S. Cl. ........................................... 176/3; 176/5
[58] Field of Search ................................ 176/1, 3, 6–8

[56] References Cited

U.S. PATENT DOCUMENTS

| 3,170,841 | 2/1965 | Post | 176/3 |
| 3,527,977 | 9/1970 | Ruark | 176/7 |
| 3,668,067 | 6/1972 | Christofilos | 176/5 |
| 3,728,217 | 4/1973 | Dawdl | 176/3 |

FOREIGN PATENT DOCUMENTS 1087287 8/1960 Fed. Rep. of Germany .............. 176/3

OTHER PUBLICATIONS

UCRL-52008 (2/3/76), pp. 1–51, Condit et al.
Physics of Fluids, vol. 17, No. 6, (6/74), pp. 1291–1301, Makijawi et al.
Physical Review Letters, (7/31/72), vol. 29, No. 5, pp. 256–259, Bzura et al.
Physical Review Letters, vol. 18, No. 7, (2/13/67), Post.
Physics of Fluids, (1964), 764, Furth et al.
UCRL-78082 (9/24/76), Condit et al.
UCRL-52170 (11/5/76), Condit et al.
UCRL-50002-74, (10/15/74).
UCRL-50002-75, (10/15/75).
ERDA-76/108, (7/28-8/1/75), pp. 702–740, Lichtenberg et al.

Primary Examiner—Charles T. Jordan
Assistant Examiner—S. A. Cangialosi
Attorney, Agent, or Firm—Dean E. Carlson; R. S. Gaither; P. Martin Simpson, Jr.

[57] ABSTRACT

A plasma confinement apparatus, wherein multiple magnetic mirror cells are linked by magnetic field lines inside of a solenoid with the mirroring regions for adjacent magnetic mirror cells each formed by a separate mirror coil inside of the solenoid. The magnetic mirror cells may be field reversed.

12 Claims, 4 Drawing Figures

PLASMA CONFINEMENT APPARATUS USING SOLENOIDAL AND MIRROR COILS

BACKGROUND OF THE INVENTION

The invention described herein was made at Lawrence Livermore Laboratory in the course of, or under, Contract W-7405-ENG-48 between the United States Energy Research and Development Administration and the University of California.

The invention pertains to the confinement of plasmas by magnetic fields. More particularly this invention relates to the confinement of plasmas by magnetic mirrors.

Apparatuses employed for the containment of plasmas by magnetic fields may utilize many varied configurations. Two well-known categories of these machines are the open-ended type such as the magnetic mirror and the toroidal type such as the tokamak and the stellarator. One advantage to the toroidal type is that a trapped charged particle must move laterally across magnetic field lines to escape confinement. Hereinafter, positive ions will be designated simply as "ions". Since the ions tend to remain in a spiral orbit about a given set of magnetic field lines, the continuity of the magnetic field lines inside the apparatus enhances containment.

An apparatus of the open-ended type has the disadvantage that the trapped charged particles may escape while traveling along the magnetic field lines which define their spiral orbits. The magnetic field lines do not close upon themselves inside the simple magnetic mirror. As a result, the simple magnetic mirror suffers large plasma losses through the mirror ends. The net positive potential of the confined plasma adds to the losses since ions are confined better than electrons in a simple magnetic mirror. One early mirror confinement apparatus is disclosed in Post, U.S. Pat. No. 3,170,841, filed on July 14, 1954. The physics of a simple magnetic mirror is discussed at length in the Post patent as well as in Samuel Glasstone and Ralph H. Loveberg, Chapter 9, "Magnetic Mirror Systems," *Controlled Thermonuclear Reactions*, D. Van Nostrand Co., Inc., Princeton, New Jersey (1960), p. 336 et seq and in David J. Rose and Melville Clark, Chapter 10, "Motion of Individual Charges," *Plasma and Controlled Fusion*, John Wiley & Son, Inc., New York (1961) p. 198 et seq.

The prior art contains many linked mirror cell systems. In previous machines the linking has been an attempt to lessen end losses along the open magnetic field lines. One approach links several mirrors together to form roughly a toroidal configuration with magnetic field lines closed inside the apparatus. Particles which leak out of one magnetic mirror simply leak into an adjacent magnetic mirror. Post noted this in FIG. 25 of U.S. Pat. No. 3,170,841, supra. Other closed systems of linked magnetic mirrors include Dandl, U.S. Pat. No. 3,728,217. Each magnetic mirror segment is independent of the next, the total effect on the toroidally confined plasma being a stabilization due to the bumpy nature of the toroidal magnetic field. No mirror cell electrostatically plugs the ends of any adjacent mirror cells. The same may be said for other linked mirror systems such as the Christofilos, U.S. Pat. No. 3,668,067 for field-reversed magnetic mirror cells. In both Dandl and Christofilos, the linked magnetic mirrors are secondary to the stabilization and confinement of the plasma.

An early linear system of linked magnetic mirrors appears in FIG. 22 of Post, U.S. Pat. No. 3,170,841. However, Post's three-cell system does not operate as three cells simultaneously. The end cells exist as thermonuclear reaction zones alternately. Two papers on multiple magnetic mirrors are Furth and Rosenbluth, Physics of Fluids 7, 764(1964) showing added plasma stability due to multiple magnetic mirrors and Post, Physical Review Letters, 18, 232(1967) showing a reduction in end losses for and open-ended system. The typical system contemplated by the prior art is shown in FIG. 1 of Makhijani et al., The Physics of Fluids, 17, 1291 (1974), which is a standard reference in the field. The solenoidal coils are far enough apart that directly under each solenoidal coil is a magnetic field maximum. Each solenoidal coil serves the dual function of providing the plasma confining magnetic field and providing the magnetic field maxima for magnetic mirrors. If the solenoidal coils are spaced closer together than the radius of the solenoidal coils, there would not be a maximum of magnetic field under each coil. This is well known in the art for Helmholtz magnetic coil sets. Such a system seems to use the least structural material and to introduce the least complexity for the plasma confinement apparatus.

While spacing solenoidal coils further apart than their radius will work to create a linear series of magnetic mirrors inside of a solenoid, the solenoidal coils must be setting up a magnetic field strong enough to contain the desired plasma at the weakest magnetic field point between the solenoidal coils. As the solenoidal coils are moved closer together to minimize the current required to set up the desired field at that point, the mirroring regions tend to become shallower for a given winding geometry. When the solenoidal coils are a coil radius apart there will be no mirroring region underneath each solenoidal coil. Another problem is the heating which occurs as a result of nuclear reactions in any hot magnetically confined plasma. Neutrons will heat the solenoidal coils unless they are adequately shielded. Too much heating rules out the use of superconductors for the windings. A normal conductor represents a distinct energy loss for the plasma confinement apparatus if it is required to provide the bulk of the magnetic field for confinement. Superconducting solenoidal coils must have a large radius to be further from the plasma and may require shielding if the nuclear reaction rate is significant. Economically, a balance must be struck between solenoidal coil size and shielding structure, which is itself damaged by neutrons.

With respect to field-reversed, magnetic mirror cells, Lawrence Livermore Laboratory Report UCRL-52008 (1976), pp 22–27, in February, 1976, disclosed a neutral-beam driven, field-reversed, magnetic mirror cell and suggested that it could be the basis for "one or more linear chains of independent mirror cells, linked end to end." It is unstated in the text and is unclear from the drawing whether the solenoidal coils could contain the plasma laterally without a significant contribution by the magnetic mirror coils, which are separate coils. The February, 1976, drawing shows a solenoidal coil with ion beam ports over the center of the field-reversed magnetic mirror cell. The magnetic mirror coils are of comparable size and thickness and are located outside of the neutron blanket and shield. Under normal circumstances, all coils outside of the shield would be superconducting; also the Ioffe bars required for plasma stability are outside the shield and would be superconducting. Lawrence Livermore Laboratory Reports UCRL-78082 (1976) and UCRL-52170 (1976) both disclose the solenoidal and associated mirror coil arrangement disclosed in this application.

SUMMARY OF THE INVENTION

The present invention provides method and apparatus for confining a plasma between multiple magnetic mirrors inside of a solenoid where the mirroring regions are set up by mirror coils separate from the solenoidal coils, which solenoidal coils supply a magnetic field of a strength sufficient to substantially confine the plasma desired.

One object of the present invention is to provide a plasma confinement apparatus of multiple magnetic mirrors within a solenoid, the apparatus comprising a solenoid generating a magnetic field of a strength sufficient to substantially confine the plasma desired and at least three mirror coils inside of the solenoid generating the magnetic field maxima necessary for at least three magnetic mirrors within the solenoid.

Another object of the present invention is to provide a plasma confinement apparatus of multiple, field-reversed, magnetic mirror cells within a solenoid, the apparatus comprising a solenoid generating a magnetic field of a strength sufficient to substantially confine the plasma desired and at least two field-reversed, magnetic mirror cells within the solenoid, the mirroring regions formed by mirror coils separate from the solenoidal coils.

Another object of the present invention is to provide a source of neutrons generated by a fusing plasma confined between multiple magnetic mirrors inside of a solenoid where the mirroring regions are set up by mirror coils separate from the solenoidal coils, which solenoidal coils supply a magnetic field of a strength sufficient to substantially confine the plasma desired.

Another object of the present invention is to provide a source of neutrons generated by a fusing plasma confined in multiple, field-reversed, magnetic mirror cells within a solenoid, the apparatus comprising a solenoid generating a magnetic field of a strength sufficient to substantially confine the plasma desired and at least two field-reversed, magnetic mirror cells within the solenoid, the mirroring regions formed by mirror coils separate from the solenoidal coils.

Other objects and advantages of the present invention will become clear from the following drawings and detailed description of the present invention.

DESCRIPTION OF PREFERRED EMBODIMENTS

Figure 1:
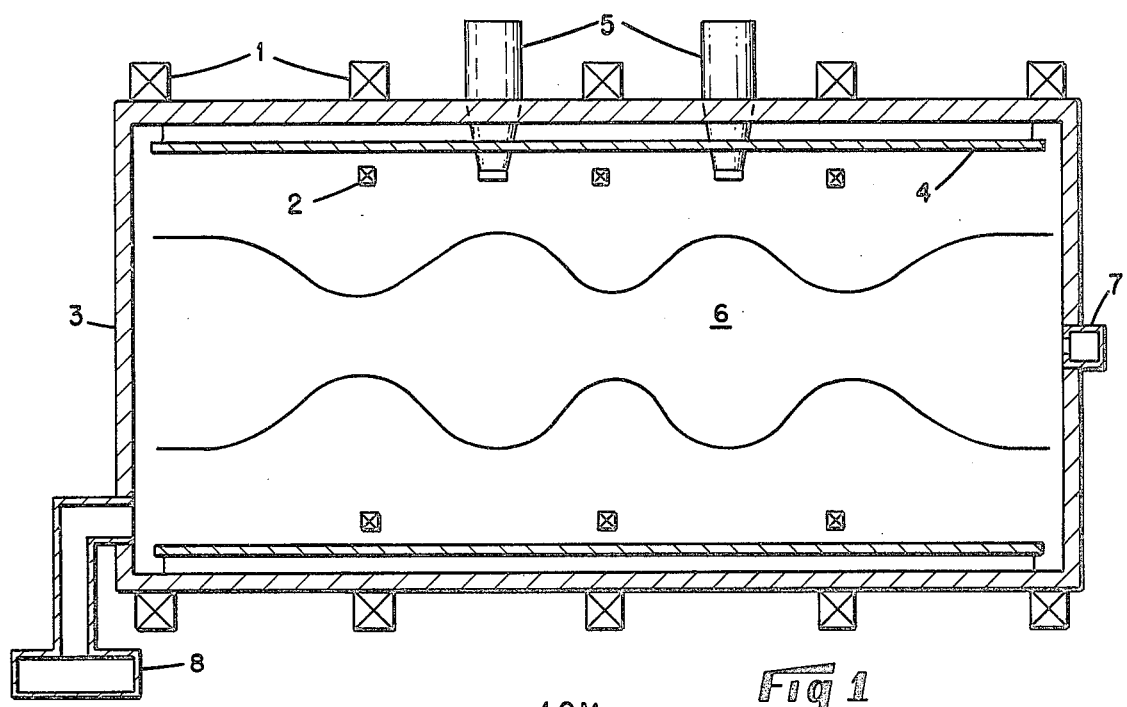
FIG. 1 is a side view of a solenoid with three magnetic field maxima to create two classical mirror cells within the solenoid.

Confinement of a plasma in an open-ended system may be separated into two parts. One part is the generation of a magnetic field of sufficient strength that at the weakest magnetic field point the net magnetic field exerts a force equal to or greater than the outward pressure of the plasma. If this were not the case, the plasma would escape. There is always leakage of a plasma across a magnetic field due mainly to collisions. The Spitzer diffusion lifetime $\tau$ is a measure of this:

$$\tau = 2 \times 10^{-13} T_e^{3/2} a^2 \text{(seconds)}$$

Where $\tau$ is the time for the number density to fall to $1/e$ of its initial value Te is electron temperature a is the minor radius of the field-reversed torus For more information see Lyman Spitzer, *Physics of Fully Ionized Gases*, 2 ed., Interscience Publishers, Inc., New York (1956) at page 38. This slow cross field diffusion can be compensated for by the addition of more plasma to the mirror cell by ion or neutral beam injection or by other means. However, cross-field diffusion is inherent in any magnetic confinement configuration.

The other part of plasma confinement is control of end leakage. In a classical magnetic mirror cell, end leakage is the dominate loss mechanism. End leakage is due to charged particles not mirroring in a mirroring region of the magnetic field. A mirroring region is a region in which a charged particle experiences an increasing magnetic field strength as it translates along an axis aligned roughly parallel with the local magnetic field lines. As the charged particle moves, the magnetic field grows to such a strength that substantially all of the energy of the charged particle is converted to orbital energy about the axis. If the axial component of kinetic energy of the charged particle is too large, the magnetic field cannot fully convert this energy to orbital energy, and the charged particle leaks out. With two mirroring regions spaced apart along magnetic field lines, a mirror cell is formed, and a charged particle may be trapped between the two mirroring regions. However, a trapped charged particle may suffer collisions with other particles. As a result, the axial component of the kinetic energy may be increased to the point where the charged particle will no longer mirror. Collisions provide the mechanism for continual end leakage from a magnetic mirror cell.

For prior art multiple mirror cells which are a linked series of largely similar classical mirror cells, confinement time can increase with the number of cells. As shown in Makhijani et al, The Physics of Fluids, 17, 1291 (1974), the average confinement time $\tau_c$ can depend on the square of the number of magnetic mirror cells:

$$\tau_c = (5\sqrt{2\pi}/8)(Ml_c/C_s)(1+2N+2\mu_c^3 N^2)$$

Where $\tau_c$ is average confinement time for a charged particle.

M is the mirror ratio Bmax/Bmin $l_c$ is the cell length $c_s = (5\pi/8)^{\frac{1}{2}}$ $\mu_c = (1 - M^{-1})^{\frac{1}{2}}$ N is a number for a system of $2N+1$ mirror cells.

Plasma stability can be added as well by the use of multiple mirrors as is shown in Furth and Rosenbluth, Physics of Fluids 7, 764 (1964). Thus a multiple mirror design with open magnetic field lines appears attractive for reasons related to the physics of plasma confinement. A multiple magnetic mirror cell approach to plasma confinement also lends flexibility. A magnetic mirror cell design may be standardized. As more plasma is needed to be confined, more cells can be added to the system. These cells can be made to share solenoidal and mirror coils and other structure. Such engineering advantages have not been pointed out in the prior art for open or closed magnetic field line systems.

The present invention is a method and an apparatus for building multiple magnetic mirror cells with either open or closed magnetic field lines. If the functions are not separated of providing a magnetic field strong enough to prevent a large cross-field plasma loss at the weakest magnetic field point and providing the function of stronger magnetic field regions for magnetic mirrors, then the solenoidal coils in the prior art must perform both functions. In the present invention, the solenoidal coils provide a magnetic field strong enough to confine the plasma in the cross field direction (with some rate of cross-field diffusion understood to be inherent in the statement). Thus the solenoidal coils may be located outside of a shield for neutrons. Without neutron heating, the solenoidal coils may be superconducting or of very large conductor cross section, for great energy savings. If a solenoidal coil is placed at or within a solenoidal coil radius at adjacent solenoidal coils, then the magnetic field between solenoidal coils does not dip to a minimum between solenoidal coils. A solenoidal coil does not have to set up a stronger magnetic field than exists in the plane of the solenoidal coil itself. The expense of more windings or higher currents on the superconductors is avoided. In addition, since some plasmas generate neutrons, the mirror coils inside the first wall can be fitted for ease of replacement after sufficient neutron damage. The mirror coils need to be normal conductors, such as copper or aluminum, in order to operate in a neutron filled environment.

For field reversed magnetic mirror cells the magnetic mirrors do not have to form a deep magnetic well. The function of the magnetic mirrors is to keep the plasma in each magnetic mirror cell separated from the plasma in an adjacent magnetic mirror cell rather than to reduce end losses. Field reversal may be achieved in two ways. The object is to create a toroidally shaped, closed-magnetic-field-line geometry. Charged particles encircling the magnetic mirror cell axis set up the particle magnetic field necessary to add to the magnetic mirror cell magnetic field to create the toroidally shaped magnetic field with plasma trapped on the closed magnetic field lines. One method to attain field reversal uses charged particles with a gyro-radius large compared to the minor radius of the field-reversed torus to be created. This method is the Astron concept which has been experimentally demonstrated as reported in Bzura et al, Physical Review, Letters 29, 256 (1972). For a detailed discussion of the Astron concept for achieving field reversal, see Christofilos, U.S. Pat. No. 3,668,067 and the references cited therein.

The other method for achieving field reversal is to use charged particles with a small gyroradius compared to the minor radius of the field-reversed torus to be created. Such a gyroradius may be a factor of 2 or less than the minor radius of the field-reversed torus. This method has been experimentally demonstrated using a theta pinch with larger currents at the ends of the theta pinch to create magnetic mirrors. Such an MHD stable field-reversed plasma is reported in Eskov et al, Proceedings of the *Seventh European Conference on Controlled Fusion and Plasma Physics*, Lausanne, 1975 (CRPP, 1975), Vol. I, p. 55. This work has been reproduced and verified by German and American research teams, "Field Reversed Theta Pinch Experiments," paper, R. Linford et al, 4A7 of the 1977 IEEE Conference on Plasma Science, Troy, New York, May, 1977. For a detailed discussion of this second method of attaining field reversal through the use of charged particles with small gyroradii, see Lawrence Livermore Laboratory Report UCRL-52170 (1976). This method of using charged particles with a small gyroradius to achieve field reversal in a neutral beam driven magnetic mirror cell was disclosed in Lawrence Livermore Laboratory Report UCRL-52008 (1976), pp. 21-27, in February, 1976. It discloses a neutral-beam driven, single, field-reversed, magnetic mirror cell which could be the basis for "one or more linear chains of independent mirror cells linked end to end." However, the mirror coils, shield, and blanket all extend down into the space where plasma would flow in passing from one cell to another of a multicell design. In a multicell design the magnetic field lines must curve outward again to form the next magnetic mirror cell. In addition, the separation of function, which is central to the present invention, is not stated or implied.

FIG. 1 is a schematic of the preferred embodiment with sinple magnetic mirror cells. Solenoidal coils 1 are of circular cross section, may be superconducting, and, set up a magnetic field of sufficient strength to laterally confine the plasma desired. The solenoidal coils 1 are spaced at or within a solenoidal coil radius of each other along a common axis through the center of and prependicular to the plane of each solenoidal coil. Hereinafter interior solenoidal coil shall refer to solenoidal coils which are not on either end of the solenoid. Inside of each of the interior solenoidal coils 1 is a mirror coil 2 whose plane is also perpendicular to the common axis. Between the solenoidal coils 1 and the mirror coils 2 is a shield 3 running in a cylindrically symmetric way about the common axis and extending through the solenoidal coils on the ends. Near the mirror coils 2 are the Ioffe bars 4 which run through the solenoidal coils on the end as well. The particle sources 5 heat, build up the number density, and maintain the number density and temperature of the plasma 6. The target plasma generator 7 may be streaming guns, a laser and pellet system, or other device for generating a plasma for the neutral beams to hit and ionize to start building up the plasma desired. Also needed are the appropriate vacuum systems 8 to reach and maintain a vacuum typically on the order of $10^{-6}$ Torr.

Figure 2:
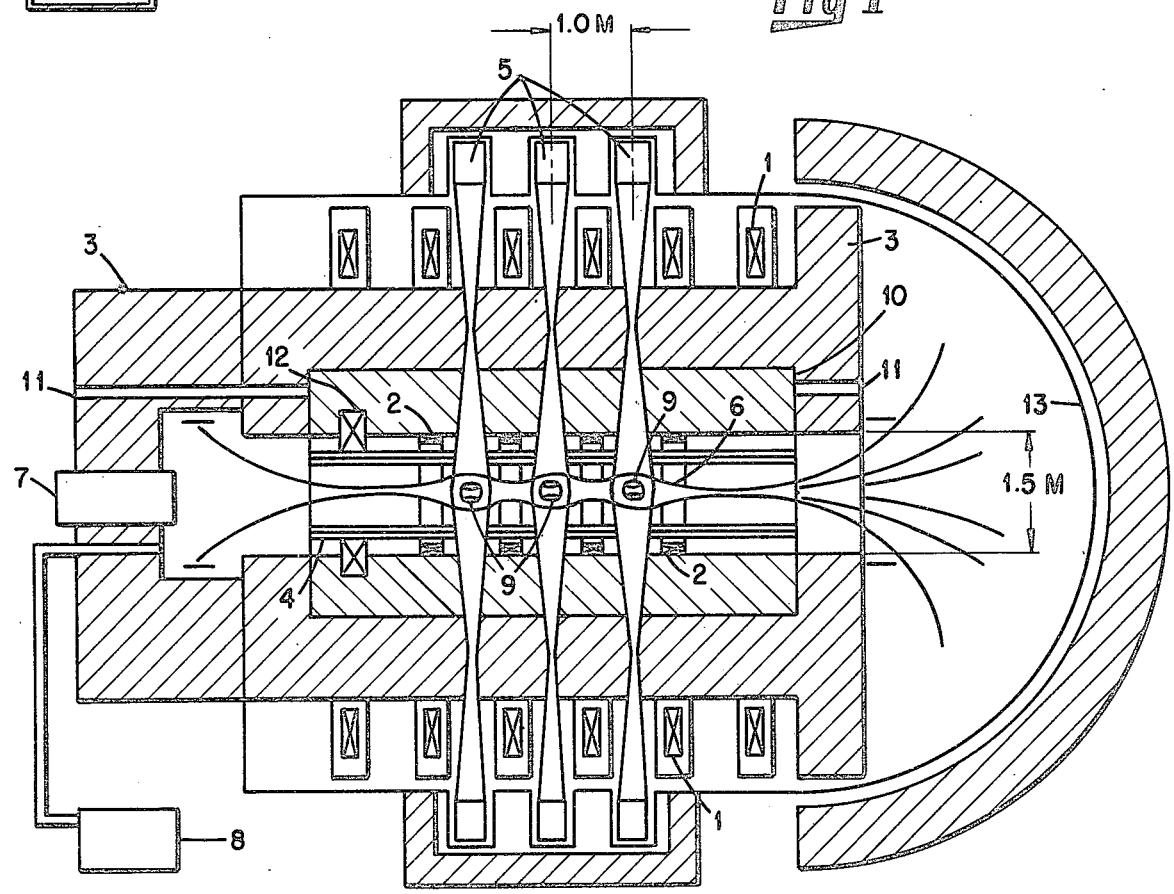
FIG. 2 is a cross section of the first alternative preferred embodiment with a solenoid enclosing three field-reversed, magnetic mirror cells, the mirroring regions being formed by separate mirror coils from the solenoidal coils. Also a direct convertor is attached to one end of the solenoid. There is a blanket.

FIG. 2 is a first alternative embodiment which show the present invention with field reversed magnetic mirror cells. Solenoidal coils 1 are of circular cross section, may be superconducting, and set up a magnetic field of sufficient strength to laterally confine the plasma desired. The solenoidal coils 1 are discretely spaced at or within a solenoidal coil radius of each other along a common axis through the center of and perpendicular to the plane of each solenoidal coil. Inside of each of the interior solenoidal coils 1 is a mirror coil 2 whose plane is also perpendicular to the common axis. Between the solenoidal coils 1 and the mirror coils 2 is a shield 3 running in a cylindrically symmetric way about the common axis and extending past the solenoidal coils on the ends. Near the mirror coils 2 are the Ioffe bars 4 which run through the solenoidal coils on the end as well. The neutral beam sources 5 heat, buildup the number density, and maintain the number density and temperature of the plasma 6. The target plasma generator 7 may be streaming guns, a laser and pellet system, or other device for generating a target plasma for the neutral beams to hit and ionize to start the building up of the plasma desired. Also needed are the appropriate vacuum systems 8 to reach and maintain a vacuum, typically on the order of $10^{-6}$ Torr. The plasma 6 is divided into three mirror cells by the four mirror coils. The torus 9 of field-reversed plasma is shown in each mirror cell. The blanket 10 is designed according to well understood principles to convert the kinetic energy of neutrons into thermal energy which may be taken off by the coolant system through the use of ducts 11. This embodiment also has a plugging coil 12 on one end of the solenoid underneath that end solenoidal coil and on the other end of the solenoid is a direct converter assembly 13, of well known design and function to a person skilled in the art. The plugging coil 12 creates a strong magnetic field at the end of the solenoid such that charged particles will preferentially leak out the other end into the direct converter assembly 13 to recover some of the energy represented by leaking charged particles.

Figure 3:
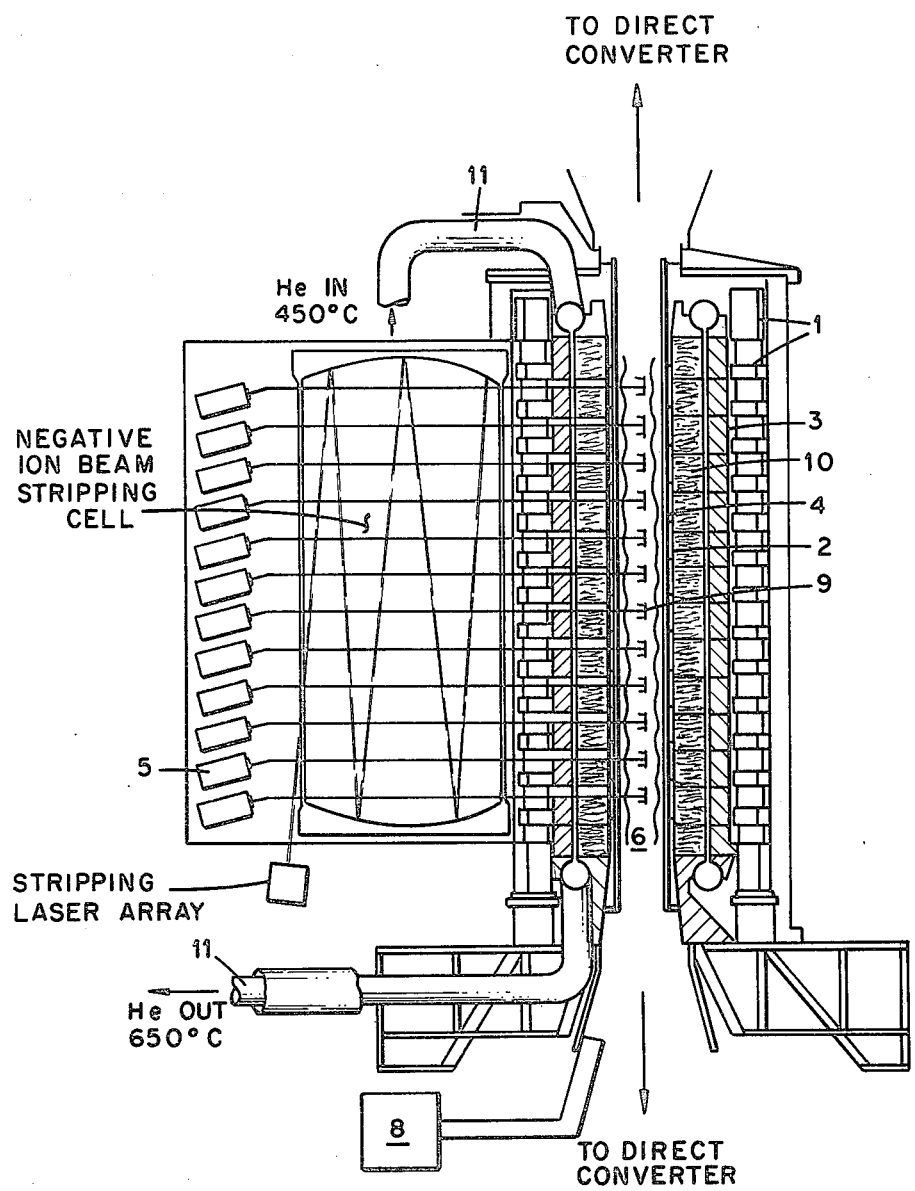
FIG. 3 is a vertical cross section of the second alternative preferred embodiment with twelve field-reversed magnetic mirror cells.
Figure 4:
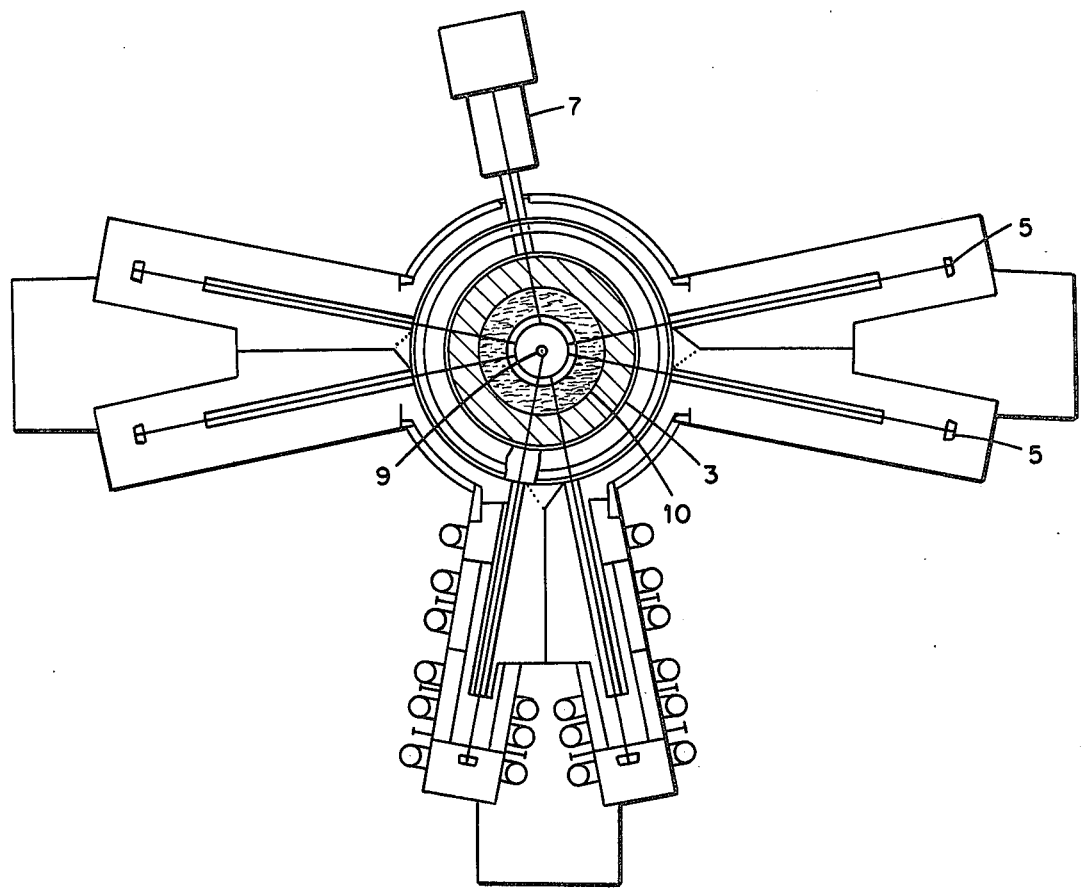
FIG. 4 is a horizontal cross section of the second alternative preferred embodiment.

FIG. 3 is a vertical cross section and FIG. 4 is a horizontal cross section of a second alternative preferred embodiment. This embodiment was designed to practice the present invention and was done under the direction of the inventors. Solenoidal coils 1 are of circular cross section, are superconducting, and set up a magnetic field of sufficient strength to laterally confine the plasma desired. The solenoidal coils 1 are spaced uniformly within a solenoidal coil radius of each other along a common axis through the center of and perpendicular to the plane of each solenoidal coil. Inside of each of the interior solenoidal coils 1 is a mirror coil 2 whose plane is also perpendicular to the common axis. Between the solenoidal coils 1 and the mirror coils 2 is a shield 3 running in a cylindrically symmetric way about the common axis and extending past the solenoidal coils on the ends. Near the mirror coils 2 are the Ioffe bars 4 which run through the solenoidal coils on the end as well. The neutral beam sources 5 heat, buildup the number density, and maintain the number density and temperature of the plasma 6. The target plasma generator 7 may be any of a number of systems such as a laser and pellet generator for producing a target plasma for the neutral beams to hit and ionize to start the buildup of the plasma desired. Also needed are the appropriate vacuum systems 8 to reach and maintain a vacuum, typically on the order of $10^{-6}$ Torr. The plasma 6 is divided into twelve mirror cells by the thirteen mirror coils. The torus 9 of field-reversed plasma is shown in each mirror cell. The blanket 10 is designed according to well understood principles to convert the kinetic energy of neutrons into thermal energy which may be taken off by the coolant system through the use of ducts 11. This second alternate preferred embodiment would produce a neutron first wall loading for a DT reaction on the order of $10^{14}$ neutrons/cm$^2$-sec. Neutron crystalography can be done there. The heat in the blanket may be used to turn a turbine. Table 1 gives further data on this embodiment.

TABLE 1

| Parameter | Value (Plasma values for a D-T reaction) |
|---|---|
| Beam energy | 200 keV |
| Plasma minor radius | 0.031 m |
| Plasma major radius | 0.062 m |
| Plasma length | 0.19 m |
| Size parameter (S) | 5 |
| Vacuum field | 8.2 T |
| Ion energy | 77 keV |
| Electron energy | 29 keV |
| Peak density | $3.6 \times 10^{21}$ ions/m$^3$ |
| Total energy | 205 kJ/cell |
| Plasma pressure ratio ($\beta$) | 1.5 |
| Blanket thickness | 1 m |
| Blanket multiplication factor | 1.7 |
| Shield thickness | 0.8 m |
| Superconducting solenoid radius | 2.4 m |
| Wall radius | 0.61 m |
| Cell length | 1.1 m |
| Injected current | 17 A/cell |
| Injected power | 3.5 MW/cell |
| Plasma profile | Cubic |
| Mirror coil current | 46 kA |
| Ioffe bar current | 10 kA |
| Mirror coil cross section | 13 cm$^2$ |
| Ioffe bar cross section | 14 cm$^2$ |
| Resistive power | 0.28 MW/cell |
| Neutron heating | 0.38 MW/cell |

For further information on the state of the art see the following references:
1. Fowler, "Tandem Mirror Plasma Confinement Apparatus," Ser. No. 807,081, filed June 16, 1977. The Tandem mirror depends on end mirror cells electrostatically plugging a large center mirror cell. The present invention does not employ electrostatic plugging, but the state of the art for starting and sustaining magnetic mirror cells is the same.
2. Lawrence Livermore Laboratory Reports UCRL-50002-74 and UCRL-50002-75 covering the range of activities in the field.
3. Saul Dushman, *Scientific Foundations of Vacuum Techniques,* 2d Ed., Wiley, New York (1962), a standard reference in the field.

This invention has been described by way of illustration rather than limitation, and it should be apparent that it is equally applicable in fields other than those described.

What we claim is:
1. An apparatus for confining a plasma using multiple magnetic mirrors within a solenoid of discrete solenoidal coils, having a magnetic field of sufficient strength to laterally confine said plasma, each not touching an adjacent solenoidal coil and each having an axis normal to a plane centered on and running through windings of the solenoidal coil the apparatus comprising:
   a solenoid of discrete solenoidal coils spaced apart linearly each axis being collinear at no more than solenoidal coil radius intervals generating a magnetic field of a strength sufficient to laterally confine the plasma desired and of a solenoidal coil radius sufficient to allow room for shielding to substantially attenuate plasma nuclear reaction products; a shield inside the solenoidal coil radius to substantially attenuate plasma nuclear reaction products;
   at least three mirror coils, each mirror coil located in a coplanar manner concentrically within a discrete solenoidal coil which is at least one end of the solenoid and which is adjacent to at least one other solenoidal coil which is concentrically located about another of the mirror coils and with the at least three mirror coils generating the magnetic field maxima necessary for at least three magnetic mirrors within the solenoid with the at least three mirror coils being shielded from the plasma only by a plurality of Ioffe bars, the Ioffe bars being inside a mirror coil radius.

2. An apparatus for confining a plasma as in claim 1, further including a particle source for introducing particles between the magnetic mirrors, the particles to be magnetically confined.

3. An apparatus for confining a plasma as in claim 2, wherein the particle source produces a neutral beam.

4. An apparatus for confining a plasma as in claim 1, wherein the plasma between each magnetic mirror forms a field reversed magnetic mirror cell.

5. An apparatus for confining a plasma as in claim 4, wherein the field reversal is due to charged particles with a small gyroradius relative to the dimensions of the field reversed region in each field reversed magnetic mirror cell.

6. An apparatus for confining a plasma as in claim 4, wherein the charged particles setting up the field reversal are comprised of at least one isotope of hydrogen.

7. A method for confining a plasma between multiple magnetic mirrors with a solenoid of discrete solenoidal coils having a magnetic field of sufficient strength to laterally confine said plasma, each not touching on adjacent solenoidal coil and each having an axis normal to a plane centered on and running through windings of the solenoidal coil, the method comprising the steps of:

positioning the solenoidal coils at intervals between discrete solenoidal coils of no more than the radius of a solenoidal coil each axis being collinear;

generating a magnetic field by means of the discrete solenoidal coils of sufficient strength to laterally confine the plasma desired and having solenoidal coil radius sufficient to allow room for shielding to substantially attenuate plasma nuclear reaction products; positioning a shield inside the solenoidal coil radius to substantially attenuate plasma nuclear reaction products;

positioning each of at least three mirror coils in a coplanar manner concentrically within a discrete solenoidal coil which is at least one end of the solenoid and which is adjacent to at least one other solenoidal coil which is concentrically located about another of the mirror coils;

generating a magnetic field by means of at least three mirror coils to form at least three magnetic field maxima for at least three magnetic mirrors within the solenoid shielding the at least three mirror coils from the plasma only by positioning a plurality of Ioffe bars inside a mirror coil radius.

8. A method for confining a plasma as in claim 7, further including a particle source for introducing particles between the magnetic mirrors, the particles to be magnetically confined.

9. A method for confining a plasma as in claim 8, whrein the particles to be magnetically confined are injected between magnetic field maxima in a neutral beam.

10. A method for confining a plasma as in claim 9, wherein each injected neutral beam contributes to forming a field reversed region between each of the magnetic field maxima.

11. A method for confining a plasma as in claim 10, wherein the field reversal is due to charged particles with a small gyroradius relative to the dimensions of each field reversed region.

12. A method for confining a plasma as in claim 11, wherein the charged particles setting up the field reversal are comprised of at least one isotope of hydrogen.

* * * * *